June 12, 1934.  H. W. RUPPLE  1,963,032
MAGAZINE FEED FOR MULTIPLE SPINDLE MACHINES
Filed Oct. 2, 1931  4 Sheets-Sheet 1
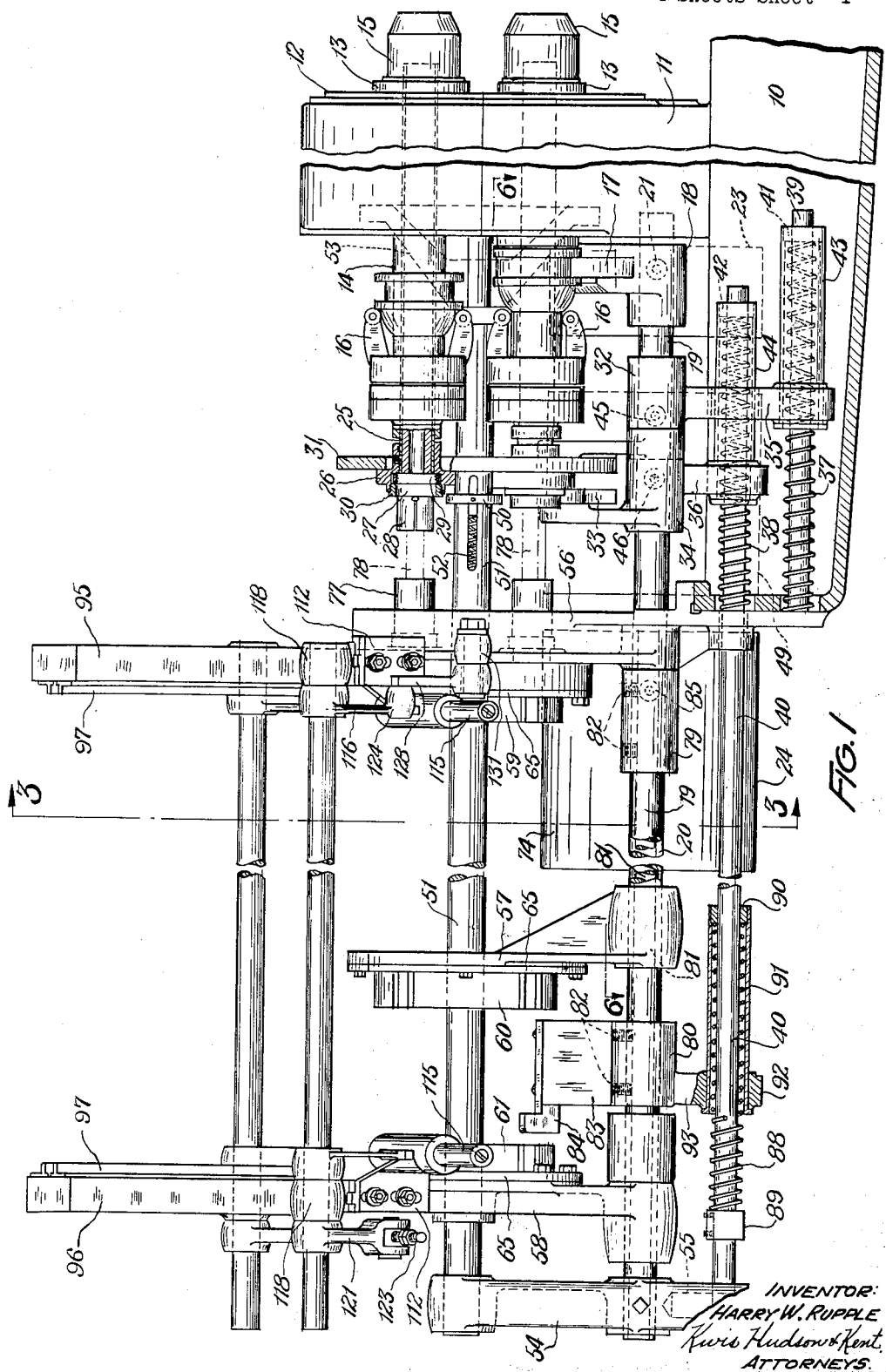
INVENTOR:
HARRY W. RUPPLE
Kwis Hudson & Kent
ATTORNEYS.

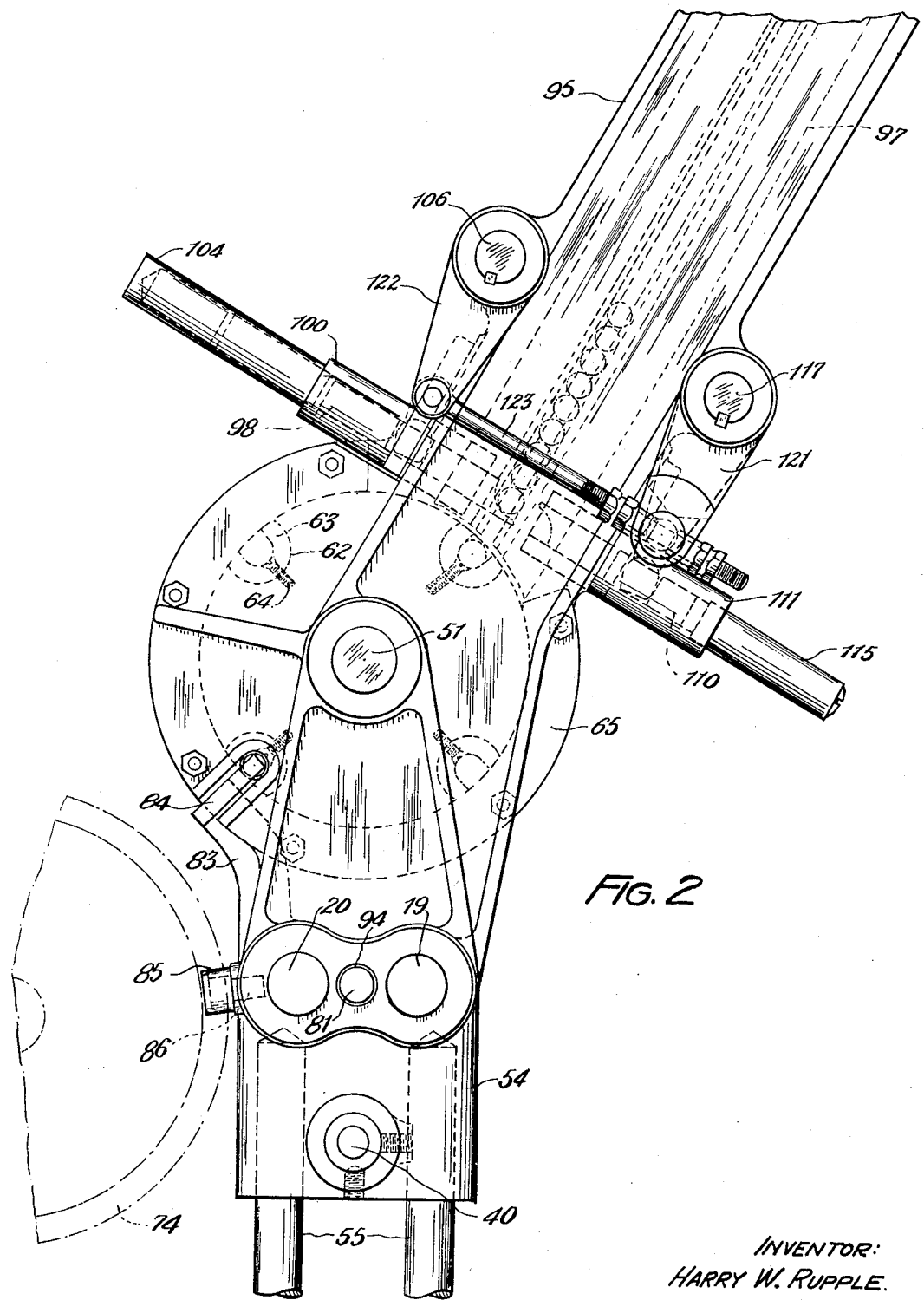

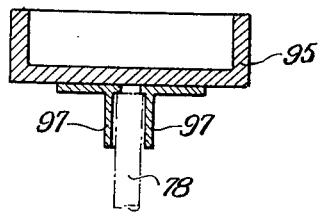
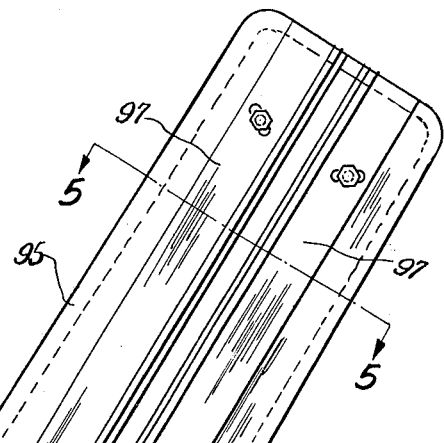
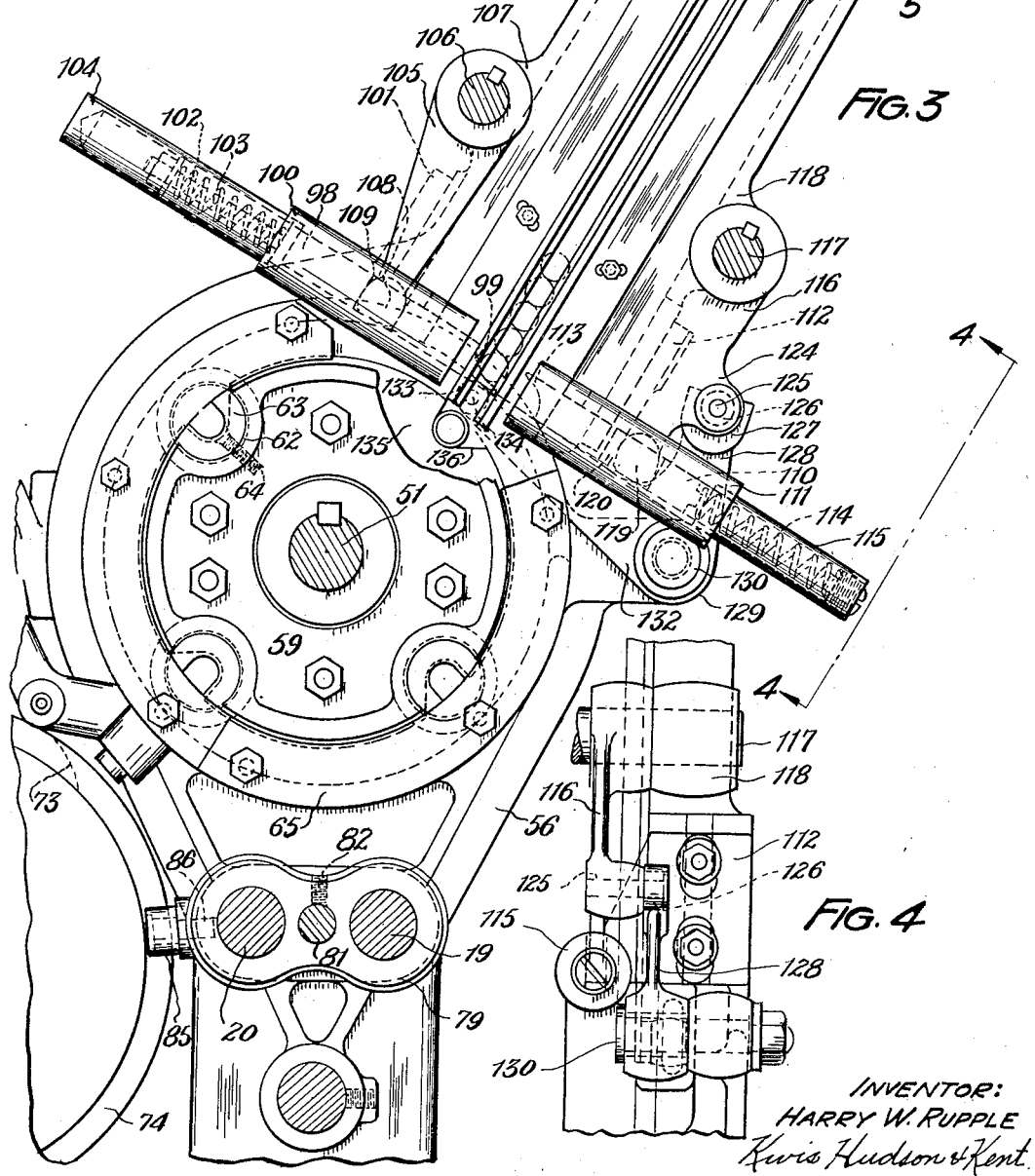

June 12, 1934.　　　　H. W. RUPPLE　　　　1,963,032
MAGAZINE FEED FOR MULTIPLE SPINDLE MACHINES
Filed Oct. 2, 1931　　　4 Sheets-Sheet 4
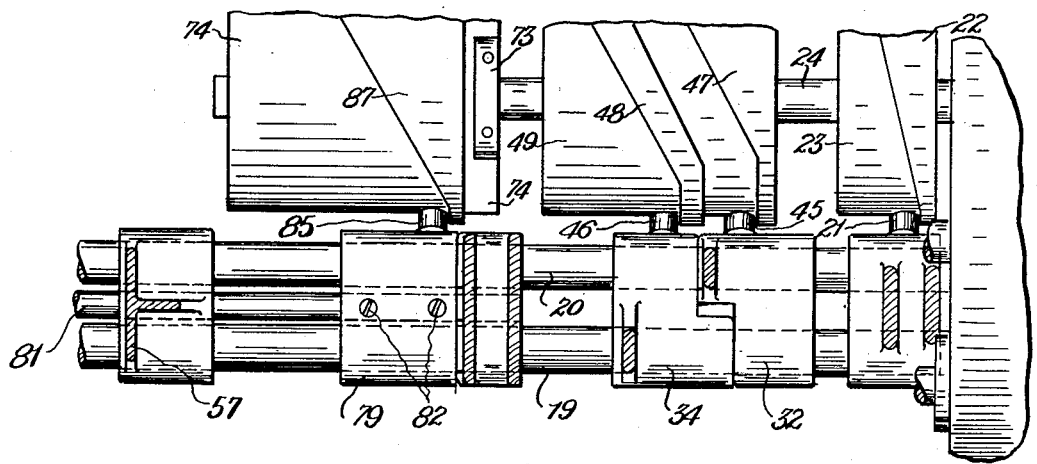
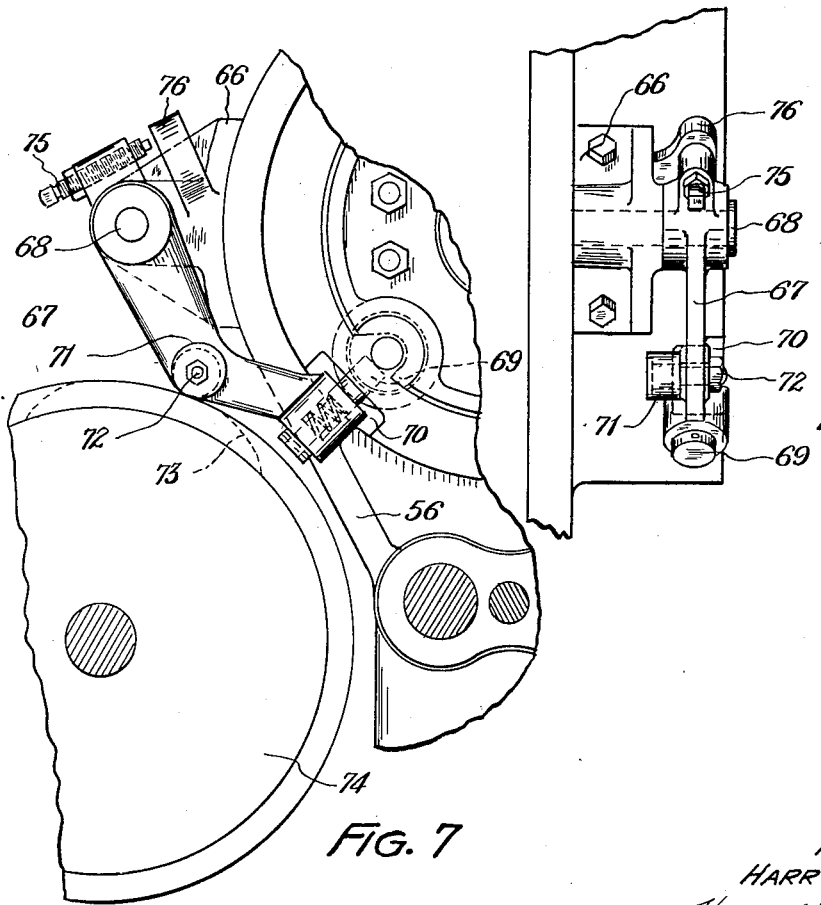
INVENTOR:
HARRY W. RUPPLE.
Kwis Hudson & Kent.
ATTORNEYS Patented June 12, 1934

1,963,032

UNITED STATES PATENT OFFICE 1,963,032

MAGAZINE FEED FOR MULTIPLE SPINDLE MACHINES

Harry W. Rupple, Shaker Heights, Ohio, assignor to The Cleveland Automatic Machine Company, Cleveland, Ohio, a corporation of Ohio Application October 2, 1931, Serial No. 566,456

15 Claims. (Cl. 29—37)

The present invention relates to automatic machine tools, and more particularly to a device for supplying and feeding work, which usually consists of stock bars or blanks, to a machine of the general class wherein finished articles or blanks are produced by machine operations from stock bars carried by a plurality of rotating spindles supported in an indexible spindle turret. In machines of the general type referred to, the work is automatically fed through the work spindle at predetermined intervals and operated upon by one or a plurality of tools located at different stations as the work is indexed from station to station.

An object of the invention is the provision of a magazine for holding a quantity of work and means for automatically feeding the same from the magazine to a machine of the character referred to as required.

Another object of the invention is the provision of a work holding and feeding means which will be economic to construct and positive in operation, which will be capable of feeding work of different lengths and size and which may be built into a machine of the type referred to, or constructed as a separate unit adapted to be attached to well known machines of the same general character.

Further objects and advantages of the invention will be apparent to those skilled in the art from the following description of the preferred embodiment of the invention described, with reference to the accompanying drawings in which:

Fig. 1 is a front elevation view of the work spindle end of a machine tool provided with the improved work magazine and feed device of this invention;

Fig. 2 is a side elevation of the same;

Fig. 3 is a view with portions in section, taken on the line 3—3 of Fig. 1;

Fig. 4 is a view taken on the line 4—4 of Fig. 3;

Fig. 5 is a sectional view taken on the line 5—5 of Fig. 3;

Fig. 6 is a view with portions in section taken on the line 6—6 of Fig. 1;

Fig. 7 is a detailed view of the stock clamping mechanism, and

Fig. 8 is a rear view of the stock clamping mechanism as shown in Fig. 7.

The machine of which the work spindle turret only is shown in Fig. 1 is a well known type of automatic machine tool, and a complete illustration and description of it is considered unnecessary. The various features of these types of machines are well known in the art, and may be found embodied in a plurality of different structures. The base of the machine is indicated in general by the reference character 10, and supports, at one end, a spindle turret housing 11, rotatably supporting a spindle turret 12. The turret 12 carries a plurality of spindles 13, of the type adapted to have the work fed by automatic means through the center thereof, rotatably supported in suitable apertures extending longitudinally of the turret and driven from the main drive shaft of the machine in any suitable manner.

The spindles 13 are of ordinary construction, comprising a rotatable sleeve 14 carrying at one end a chuck body 15, adapted to hold the work, and at the other end mechanism indicated in general by the reference character 16 for operating the jaw of the chuck intermittently to grip the stock during the forming operation, and to release it when the feeding mechanism is operating. Spindles of the type referred to are shown in U. S. patent to J. P. Brophy, No. 1,779,529, issued October 28, 1930. The mechanism 16 is operated by a yoke member 17, carried by a member 18, slidably mounted on fixed rods 19 and 20 carried in the base 10 of the machine. The member 18 is provided with a cam roller 21 adapted to be engaged and be operated by a cam plate 22 on a cam drum 23 fixed to a cam shaft 24. Located inside of the tube 14 and stopping short of the chuck jaws is a second tube 25 constituting the stock feeding member. The inner end of the tube 14 carries resilient jaws adapted to grip and feed the work forward when the jaws 15 are released. A disc 26 is mounted on the outer end of the tube 14 and rotatably carries a member 27 provided with resilient jaws 28. The member 27 is threaded into a bushing 29 rotatably held in the disc 26 by means of a nut 30.

The discs 26 are adapted to be engaged and moved in one direction by a ring-shaped shoe member 31 carried by a member 32 and in the other direction by a shoe member 33 carried by a member 34. The members 32 and 34 are slidably mounted on the rods 19 and 20 and are provided with projections 35 and 36, respectively, and are continuously urged toward the right, as viewed in Fig. 1, by springs 37 and 38 mounted on fixed rods 39 and 40. The springs are compressed between the base of the machine and closed ends 41 and 42 of tubes 43 and 44 carried by the projections 35 and 36. The members 32 and 34 are provided with cam rollers 45 and 46 respectively, adapted to engage and be operated by cam plates 47 and 48, carried on a cam drum 49 fixed to the cam shaft 24. The construction is such that the shoe members 31 and 33 engage the discs 26 to advance and retract the tubes 25 in timed relation to the chuck opening and closing operations, so that the work is fed forward at predetermined intervals.

A member 50 adapted to engage the discs 26 and limit their movement toward the left, as viewed in Fig. 1, is slidably mounted on a shaft 51 and urged towards the right by a light compression spring 52 located in a recess in the shaft. The shaft 51 is supported at one end in a bracket 53, bolted or otherwise attached to the spindle turret 12 and at the other end in a bracket 54.

The rods 19 and 20, which support the magazine proper, project beyond the base 10 of the machine and are supported at their extending ends in the bracket 54, previously referred to, provided with a floor stand 55. A bracket 56 is bolted or otherwise secured to the base 10, and brackets 57 and 58 are adjustably mounted on the rods 19 and 20. Disc shaped members 59, 60 and 61 are non-rotatably fixed to the shaft 51, and rotatable within suitable openings in the brackets 56, 57 and 58, respectively. The members 59, 60 and 61 are similar in construction and are provided with spaced cut-away portions 62 opening into the circumference thereof. The openings 62 are adapted to support pieces of rod or tube stock, etc., in axial alignment with the work spindles, and to accommodate different sizes of stock are provided with removable and/or adjustable bushings 63, held in position by screws 64, or any suitable means. The stock is held within the openings 62 by guide rings 65, bolted or otherwise secured to the brackets 56, 57 and 58. Like the bushings 63, the guide rings 65 may be adjustably mounted to accommodate different sizes of work or may be replaced by rings of different size.

The feeding operation takes place in the lower rear station, as viewed in Fig. 1. A bracket 66 is secured to the rear of the bracket 56, and a member 67 is pivotally mounted on a pin 68 carried thereby. The member 67 carries at its free end a spring plunger 69, adapted to engage a work piece located in the feeding station through a suitable opening 70 in the bracket 56 and hold it stationary during the non-feeding movement of the tube 25. The member 67 is moved to its disengaged position by gravity and to its engaged position by the engagement of a cam roller 71 rotatably mounted on a pin 72 carried by the member 67, with a cam 73 secured to a cam drum 74 on the cam shaft 24. The member 67 is provided with an adjustable stop screw 75 adapted to engage a projection 76 on the bracket 66 and limit the clockwise movement of the bracket as viewed in Fig. 7. At each station a sleeve member 77 is bolted or otherwise secured to the member 59 and helps to support and guide the work during its movement through the machine. Pieces of work 78 are shown in dotted line in Fig. 1 extending between the sleeves 77 and the spindles.

Members 79 and 80 slidably mounted on the rods 19 and 20 are connected together by a rod 81 fixed thereto by the screws 82. An arm 83 projects to the rear from the member 80 and carries an angular bar 84 adapted to engage the end of a piece of work and feed it to the machine as the member is reciprocated. The rod 81 is located between the rods 19 and 20 and the member 80 is adapted to be adjusted thereon to accommodate different lengths of work. A cam roller 85 mounted on a pin 86 fixed to the member 79 operatively engages a cam plate 87 secured to the cam drum 74. The engagement of the cam plate 87 with the cam roller 85 moves the feeding mechanism, consisting of the parts 79, 80 and 84, etc., to the left, as viewed in Fig. 1.

The feeding mechanism is moved to the right by a spring 88 mounted on the rod 40, and compressed between a collar 89 adjustably mounted on the rod 40 and a closed end 90 of a tube 91 connected in a boss 92 in an arm 93 projecting from the member 80. The bracket 54 is provided with an opening 94, through which the end of the rod 81 may project as it is reciprocated during the feeding operation.

The work or stock magazine of the machine consists of members 95 and 96 projecting vertically and toward the front from the brackets 56 and 58 respectively. T-shaped guide plates 97 are adjustably secured to the adjacent sides of the members 95 and 96 and are adapted to support therebetween a plurality of work pieces in such a position that they may be fed to the rotatable work carriage comprising the discs 59, 60 and 61, respectively, etc., at the upper front station.

The work pieces supported by the vertical members 95 and 96 are fed to the work carriage one at a time as the work pieces in the carriage are exhausted by the following mechanism. Plungers 98 provided with cam surfaces 99 which project in the path of the work are slidably mounted in suitable bosses 100 carried by the brackets 101 adjustably secured to the rear faces of the members 95 and 96. The plungers 98 are continuously urged to the left as viewed in Figs. 2 and 3 by tension springs 102 mounted on reduced end portions 103 of the plunger 98, in tube members 104 carried by the bosses 100. The plungers 98 are operated by levers 105 keyed to a shaft 106 rotatably mounted in suitable bosses 107 on the vertical members 95 and 96. The lower ends of the levers 105 are provided with a finished head 108 adapted to extend into and engage slots 109 in plungers 98.

Plungers 110 are slidably mounted in suitable bosses 111 carried by brackets 112 adjustably bolted or otherwise secured to the front faces of the vertical members 95 and 96 and are provided with reduced end portions 113 adapted to be projected between the bottom two work pieces in the magazine. The plungers 110 are continuously urged to their engaging position by springs 114 mounted inside of tubes 115 carried by the bosses 111.

The plungers 110 are moved into the path of the work by levers 116 keyed to a shaft 117 rotatably mounted in suitable bosses 118 on the front of the members 95 and 96. The levers 116 are provided at their free ends with finished heads 119 adapted to engage within elongated slots 120 in the plungers 110. The brackets 101 and 112 are adjustably mounted on the members 95 and 96 so that the plungers 98 and 110 may be located to accommodate different sizes of work.

Levers 121 and 122 are keyed to the shafts 106 and 117 respectively. The lower ends of these levers are of yoke form and are operatively connected together by means of an adjustable link 123 so that the two shafts move in unison.

The righthand lever 116 as viewed in Fig. 1 carries a boss 124 in which is mounted a pin 125 carrying a roller 126. The roller 126 is engaged by a yoke member 127 carried by an arm 128 of a bell crank lever 129 pivotally mounted on a pin 130 supported in a boss 131 on the bracket 56. The other arm 132 of the bell crank lever 129 extends toward the center of the machine and carries a cam roller 133 mounted on a pin 134 carried at the end thereof. The cam roller 133 is adapted to engage a cam plate 135 bolted or otherwise secured to the disc member 59. The cam plate 135 is provided with cut away portions 136 through which the work passes. The construction is such that when there is no work projecting through the cam plate 135 the cam roller 133 drops into the cut away portion 136 as the work carriage is indexed permitting the springs 102 and 114 to operate the plungers 98 and 110 to feed a work piece to the carriage. While a work piece extends through the cam plate 135 no movement of the bell crank and the plungers, etc., takes place as the work carriage is indexed.

The operation of the machine is as follows: Under normal operating condition with work pieces in all the spindles, the spindle turret together with the shaft 51 and the rotatable work supporting carriage are indexed at predetermined intervals to carry the work pieces from station to station in the machine. A complete article is formed in each spindle with every revolution of the spindle turret and it is necessary to feed the stock in each spindle forward once during a cycle of operation. The feeding operation takes place at the lower rear station and as the work is indexed to this station the chuck 15 releases the work held therein, by the engagement of the cam roller 21 with the cam plate 22, the shoe 33 engages the disc 26 and under the action of the spring 38 moves the tube 25 forward to feed the work through the chuck; the chuck closes and the spring plunger 69 engages the stock located in the carriage and the shoe 31 moves to its rear position under the action of the cam roller 45 on the cam plate 47 thus moving the sleeve 25 over the work projecting therethrough.

Under some circumstances a second work piece will be located in the rotatable carriage directly in alignment with the work in the spindles, in which event it will be advanced to the spindle feeding mechanism by the bar 84 engaging the end thereof. The member 84 is reciprocated in definite timed relation to the other operations by the engagement of the cam roller 85 with the cam plate 87. The bar 84 is moved to the left as viewed in Fig. 1 beyond the disc 61 during the indexing of the work carriage.

The work carriage is indexed through successive cycles without producing any operation of the magazine feeding mechanism until the stock has advanced through the cam disc 135 after which as the vacant position is brought to the upper front station the cam roller 133 drops into the cut away portion 136 permitting the plungers 98 and 110 to feed a single piece of work to the work carriage. As the work carriage is again indexed the roller 133 rides up on the face of the cam disc 135 returning the plungers 98 and 110 to their normal position.

The stock magazine and feed mechanism as illustrated in the drawings, is shown applied to a standard machine well known in the art, but it is understood that the invention contemplates a construction wherein the stock magazine and feed mechanism is built as an integral part of the machine, the entire assembly being supported on a single base, etc. The embodiment of the invention described and illustrated is merely the preferred form and I do not intend to be limited to the particular construction shown which may be varied within the scope of this invention, and particularly point out and claim as my invention:

1. In a machine of the character described, the combination with a plurality of rotatable spindles supported in an indexible turret, of a rotatable carriage adapted to support work in alignment with said spindles, means for feeding work from said carriage to said spindles, a magazine supported adjacent said carriage adapted to support a quantity of work, and means for automatically feeding work from said magazine to said rotatable carriage.

2. In a machine of the character described, the combination with a rotatable spindle adapted to have work fed therethrough, of a frame, a rotatable carriage carried by said frame and adapted to support a work piece in alignment with said spindle, projections on said frame adapted to support a plurality of work blanks, slidable members carried by said projections and adapted to extend in the path of the work pieces supported by said projections, and means for moving said slidable members whereby the work is fed one piece at a time to said rotatable carriage.

3. In a machine tool, the combination of a frame, a work spindle carried by said frame and adapted to support a work piece in a position to be machined, a rod mounted in said frame, a bracket mounted on said frame, a second bracket mounted on said rod, means on said brackets for supporting a quantity of work pieces, a carriage rotatably mounted within said brackets and adapted to support a work piece in alignment with said spindle, means slidably mounted on said rod for feeding a work piece supported in said carriage to said spindle, and means on said brackets for feeding work pieces supported thereby to said carriage at predetermined intervals.

4. In a machine tool, the combination of a frame, an indexible spindle turret carried by said frame, a plurality of work spindles carried by said turret, a rotatable carriage adapted to support a work piece in alignment with one of said spindles, means operatively connecting said turret and said carriage whereby they are indexed as a unit, and means supported on said frame for feeding work from said carriage to said spindles.

5. In a machine tool the combination of a frame, a spindle turret supported by said frame, a work spindle rotatably supported in said turret, a shaft supported in said frame and connected to said turret, a cylindrical member fixed to said shaft and adapted to support a work piece in alignment with said spindle, means for indexing said turret cylindrical member, means carried by said frame adapted to feed work supported by said cylindrical member to said spindle, means carried by said frame adapted to support a quantity of work, and means for feeding work from said last mentioned means to said cylindrical member at predetermined intervals.

6. A machine tool of the character described, comprising a rotatable spindle, a rotatable member adapted to support a work piece in alignment with said spindle, a magazine adjacent said member and communicating therewith adapted to support a plurality of work pieces, and means controlled by the rotation of said member adapted to feed work pieces positioned in said magazine to said member.

7. A machine tool of the character described, comprising a rotatable spindle adapted to have work pieces fed through the center thereof, a rotatable member adapted to support a work piece in alignment with said spindle, a magazine adjacent said member and communicating therewith adapted to support a plurality of work pieces, means for feeding work pieces from said magazine to said member at predetermined intervals, said last mentioned means being rendered inoperative by a work piece positioned in said member.

8. A machine of the character described, comprising a frame, a work spindle supported by said frame and adapted to have a work piece fed through the center thereof, a rotatable member for supporting a work piece in alignment with said spindle, means for feeding work supported by said member through said spindle at predetermined intervals, a magazine adapted to support a plurality of work pieces in position to be fed to said member, and means adapted to feed work pieces positioned in said magazine to said member, said last mentioned means being rendered inoperative by a work piece positioned in said member.

9. A machine tool of the character described, comprising a rotatable spindle, a rotatable member adapted to support a work piece in alignment with said spindle, a magazine adjacent said member and adapted to support a plurality of work pieces in position to be fed to said member, a plunger normally positioned below the bottom work piece in said magazine, a second plunger adapted to be projected into said magazine above the bottom work piece therein, and means controlled by the rotation of said member for moving said second plunger into said magazine and withdrawing the first mentioned plunger whereby a work piece in said magazine is fed to said member.

10. A machine tool of the character described, comprising a rotatable spindle, a rotatable member adapted to support a work piece in alignment with said spindle, a magazine adjacent said member and adapted to support a plurality of work pieces in position to be fed to said member, a plunger normally positioned below the bottom work piece in said magazine, a second plunger adapted to be projected into said magazine above the bottom work piece therein, and means for moving said second plunger into said magazine and withdrawing the first mentioned plunger whereby a work piece is fed from said magazine to said member, said last mentioned means being rendered inoperative by a work piece positioned in said member.

11. A work feeding device for machine tools of the character described, comprising a frame, a carriage rotatably supported by said frame and adapted to support a work piece in alignment with a spindle, means for feeding a work piece supported in said carriage to said spindle, means for supporting a plurality of work pieces adjacent said carriage, and automatic means for feeding work pieces from said last mentioned means to said carriage, said last mentioned means being rendered inoperative by a work piece positioned in said carriage.

12. A work feeding device for machine tools of the character described, comprising a frame, a rotatable carriage supported by said frame and adapted to support a plurality of work pieces in spaced relationship and in alignment with a plurality of work spindles, means on said frame for supporting a plurality of work pieces adjacent said carriage, and automatic means for feeding said work pieces one at a time to said carriage at predetermined intervals, said last mentioned means being rendered inoperative by the position of work pieces in said carriage.

13. A machine tool of the character described, comprising a frame, a spindle turret rotatably supported by said frame and adapted to be indexed through a plurality of stations, a plurality of spindles rotatably supported by said spindle turret, a plurality of chucks supported by said spindles, means for operating said chucks at predetermined intervals, feed means supported by said spindles adapted to feed work through the center thereof at one of said stations, a rotatable member supported in alignment with said spindle turret and indexed therewith adapted to support work pieces in alignment with said spindles, a magazine supported by said frame adapted to support a plurality of work pieces, and means for automatically feeding work pieces from said magazine to said member at predetermined intervals, said last mentioned means being rendered inoperative by the position of work pieces in said member.

14. A work magazine and feed device for a machine tool of the character described comprising a frame, a carriage rotatably supported by said frame adapted to support a work piece in alignment with a work spindle, means for intermittently rotating said carriage, means for feeding a work piece supported by said carriage to the work spindle, a magazine adjacent said carriage for supporting a quantity of work pieces, and means for automatically feeding work pieces supported in said magazine to said carriage at predetermined intervals, said last mentioned means being controlled by the passage of the work pieces from said carriage.

15. A work magazine and feed device for a machine tool of the character described comprising a frame, a rotatable member supported by said frame adapted to support a plurality of work pieces in alignment with a plurality of work spindles, means for rotating said member, a magazine supported by said frame adjacent said member and adapted to support a plurality of work pieces, and means for automatically feeding work pieces supported in said magazine to said member controlled by the rotation of said member.

HARRY W. RUPPLE.